(12) United States Patent
Tate et al.

(10) Patent No.: US 6,883,875 B2
(45) Date of Patent: Apr. 26, 2005

(54) CONTROLLING PRESSURE IN BRAKE ACTUATION OUTPUTS

(75) Inventors: Derek Tate, Melksham (GB); Andrew Ross Bradley, Chippenham (GB)

(73) Assignee: Westinghouse Brakes (UK) Limited, Chippenham (GB)

( * ) Notice: Subject to any disclaimer, the term of this patent is extended or adjusted under 35 U.S.C. 154(b) by 0 days.

(21) Appl. No.: 10/239,722

(22) PCT Filed: Feb. 16, 2001

(86) PCT No.: PCT/GB01/00649

§ 371 (c)(1),
(2), (4) Date: Mar. 24, 2003

(87) PCT Pub. No.: WO01/62567

PCT Pub. Date: Aug. 30, 2001

(65) Prior Publication Data

US 2003/0155808 A1 Aug. 21, 2003

(30) Foreign Application Priority Data

Feb. 25, 2000 (GB) ............................................ 0004583

(51) Int. Cl.$^7$ ............................................... B60T 13/00
(52) U.S. Cl. ................ 303/9.62; 303/113.2; 303/113.5; 303/186; 303/127
(58) Field of Search ............................... 303/20, 113.2, 303/113.5, 9.62, 186, 127, 133; 701/70, 71

(56) References Cited

U.S. PATENT DOCUMENTS

| | | | | |
|---|---|---|---|---|
| 3,845,991 A | * | 11/1974 | Engle | ............................. 303/3 |
| 4,699,436 A | | 10/1987 | Klein | |
| 4,784,444 A | * | 11/1988 | McCann et al. | ......... 303/118.1 |
| 5,415,466 A | * | 5/1995 | Breen et al. | ................... 303/7 |
| 5,572,187 A | * | 11/1996 | Williford | ..................... 340/454 |
| 5,634,700 A | | 6/1997 | Decker et al. | |
| 6,048,040 A | * | 4/2000 | Ross | ....................... 303/119.1 |
| 6,186,602 B1 | * | 2/2001 | Jonner et al. | ............. 303/115.4 |
| 6,249,736 B1 | | 6/2001 | Schmidt et al. | |

FOREIGN PATENT DOCUMENTS

| | | |
|---|---|---|
| DE | 3431 432 A 1 | 2/1986 |
| DE | 1960 1792 | 7/1997 |

* cited by examiner

*Primary Examiner*—Jack Lavinder
*Assistant Examiner*—Mariano Sy
(74) *Attorney, Agent, or Firm*—Welsh & Katz, Ltd.

(57) ABSTRACT

A valve arrangement is disclosed for controlling the pressure in first and second brake actuation outputs (9, 10). First and second air inlet valves (1,3) supply air to respective ones of the actuation outputs; first and second exhaust valves (2,4) are each associated with a respective one of the inlet valves; and a link valve (11) is between the actuation outputs. The arrangement is such that the pressure in each of the actuation outputs is controllable selectively either in mode a) jointly, with the link valve enabling air flow between the actuation outputs or in mode b) independently, with the link valve blocking air flow between the brake actuation outputs.

3 Claims, 3 Drawing Sheets

CONTROLLING PRESSURE IN BRAKE ACTUATION OUTPUTS

In a conventional railway brake, the brake force is normally proportional to the brake actuator pressure. Depending on the installation, a higher pressure will result in a larger brake force. Alternatively, where the brake force is spring applied, the larger pressure will result in a lower brake force due to the spring being compressed by the air pressure. Importantly, the rates of pressure rise and fall are specified under various conditions to ensure passenger safety and comfort or to ensure all types of traffic meet similar performance criteria.

Service conditions specify different rates for the inflow and exhaust of air from various operating conditions. The following are examples of those conditions.

Normal service application and release.
Emergency application and release.
Security application and release.

Further, for the conditions described above, it is usual for the brake actuator pressure in all the actuators of a bogie to be the same. There are conditions however where the brake pressures need to be different. An example of this is low wheel to rail adhesion.

According to the present invention, there is provided a valve arrangement having first and second brake actuation outputs for first and second brake actuators, for controlling pressure in the first and second brake actuation outputs, comprising: first and second air inlet valves for supplying air to respective ones of the actuation outputs; first and second exhaust valves, each associated with a respective one of the inlet valves; and a link valve between the actuation outputs, the arrangement being such that the pressure in each of the actuation outputs is controllable selectively either in mode a) jointly, with the link valve enabling air flow between actuation outputs or in mode b) independently, with the link valve blocking air flow between the actuation outputs.

There could be control means for selecting whether the pressure in each of the actuation outputs is controlled in mode a) or b).

The control means could be such that when the pressure in each of the actuation outputs is controlled in mode a), the maximum rate of change of brake actuator pressure is set by controlling operation of the inlet and exhaust valves and when the pressure in each of the actuation outputs is controlled in mode b), the rate of change of each brake actuator pressure is set by the condition of its respective inlet and exhaust valves.

The control means could be able to release the pressure in each of the brake actuators.

Figure 1:
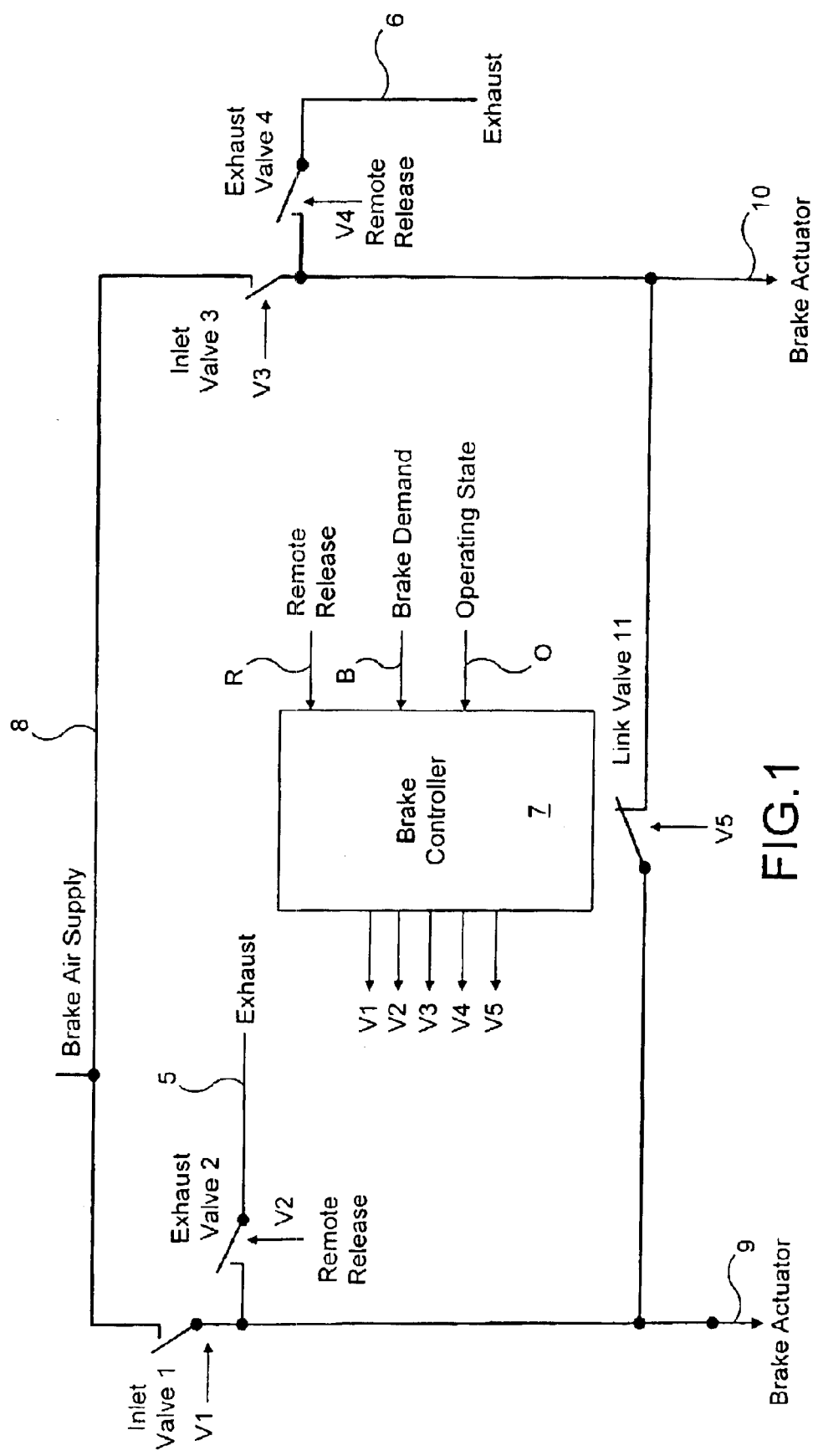
Figure 2:
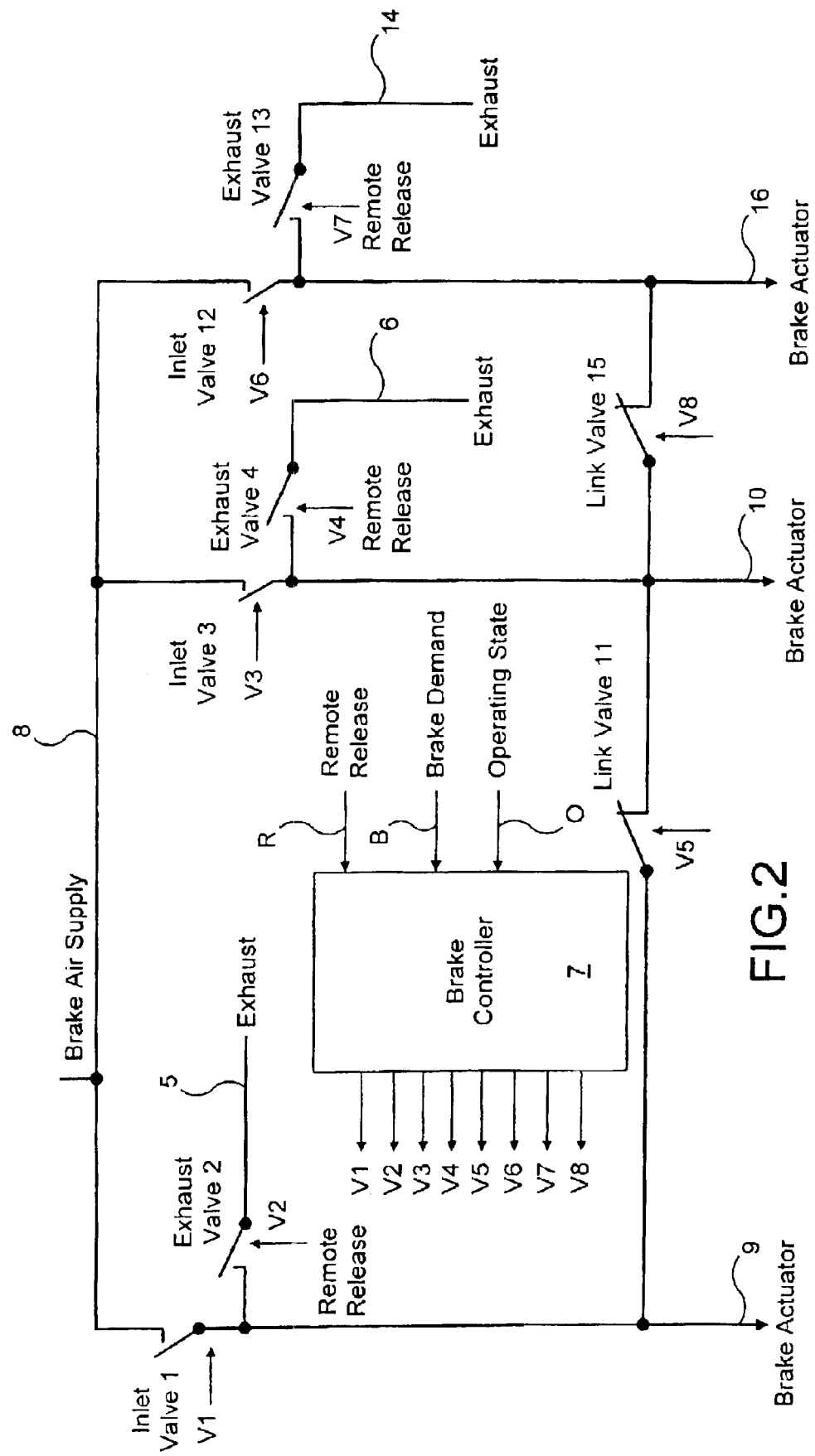
Figure 3:
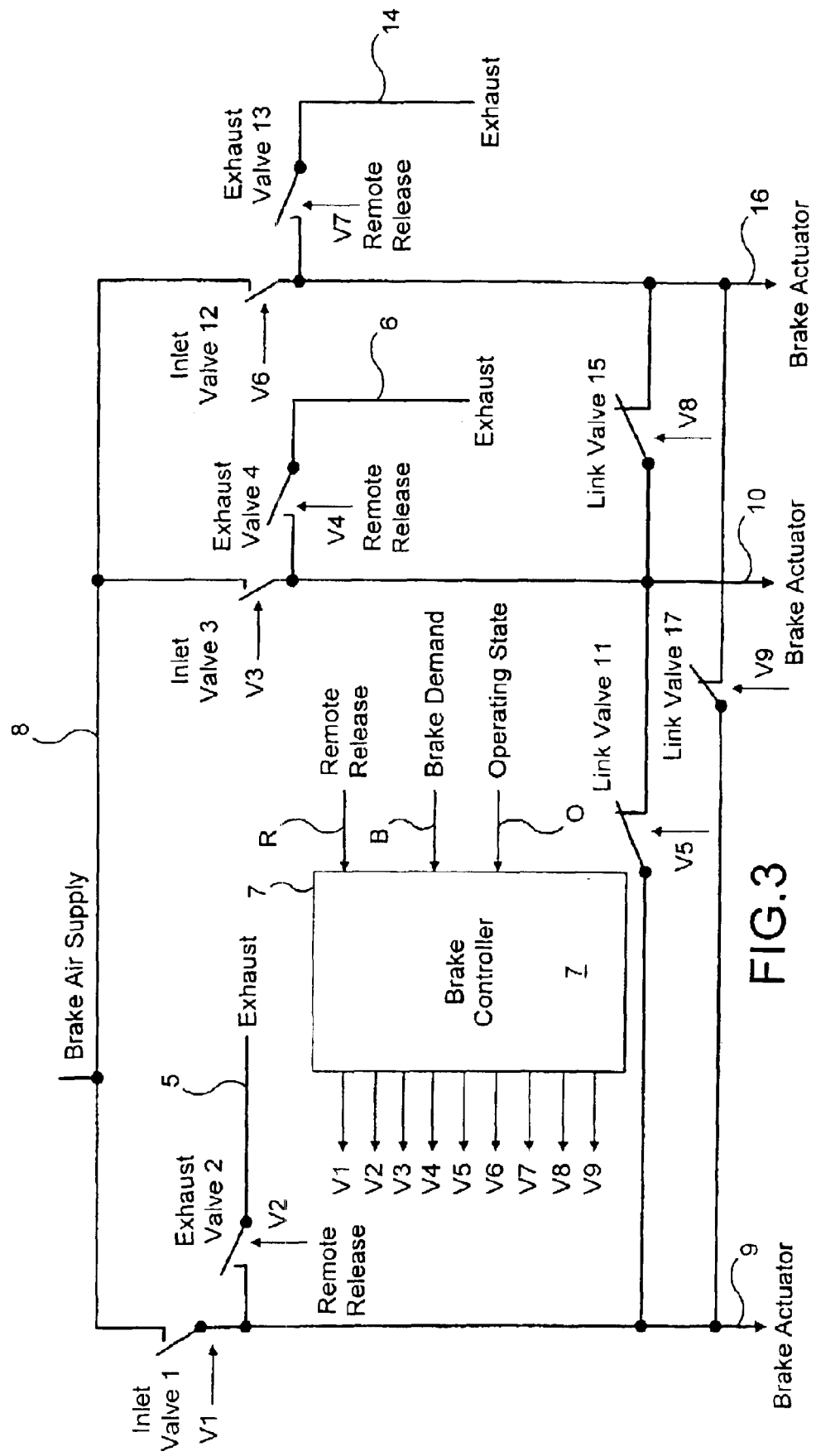

The present invention will now be described, by way of example, with reference to the accompanying drawings, in which:

FIG. 1 shows an arrangement according to an example of the invention for use with a bogie with two axles; and FIGS. 2 and 3 show arrangements according to examples of the invention each for use with a bogie with three axles.

Referring first to FIG. 1, reference numeral 8 designates a brake air supply pipe which feeds (in a first channel) a first brake actuator via an inlet valve 1 and a pipe 9 and (in a second channel) a second brake actuator via an inlet valve 3 and a pipe 10. Connected to the outlet of inlet valve 1 is an exhaust valve 2 having an exhaust outlet 5 and connected to the outlet of inlet valve 3 is an exhaust valve 4 having an exhaust outlet 6. Connected between pipes 9 and 10 is a link valve 11.

Reference numeral 7 designates an electronic brake controller fed with electrical input signals R, B and O being a remote release signal, a brake demand signal and an operating state signal respectively. The electrical outputs of controller 7 are a signal V1 for controlling inlet valve 1; a signal V2 which is a remote release signal for exhaust valve 2; a signal V3 for controlling inlet valve 3; a signal V4 which is a remote release signal for exhaust valve 4; and a signal V5 for controlling link valve 11.

For braking conditions where the brake effort for both brake actuators is required to be identical, the link valve 11 is opened, connecting the actuators together.

The rate of rise and fall of air pressure in the actuators can be controlled by activating a combination of inlet and exhaust valves. For example, a slow pressure rise can be met by activating only one inlet valve (1 or 3), connecting both brake actuators to the brake air supply pipe 8. Likewise, a slow fall in pressure can be met by activating only one exhaust valve (2 or 4), connecting the brake actuator 9 or 10 to atmosphere as required. A fast rise or fall can be met by activating all inlet or exhaust valves respectively.

Where the brake effort for each axle is required to be different, the link valve 11 is closed, breaking the air link between the brake actuators. In this condition, the pressure in brake actuator 9 is controlled by the inlet valve 1 and exhaust valve 2. Likewise, the pressure in brake actuator 10 is controlled by the inlet valve 3 and exhaust valve 4. Each brake actuator therefore has its own set of control valves.

FIGS. 2 and 3 each shows how the principle described above can be extended to a bogie with three axles. In FIG. 2, there is an extra channel with an extra pipe 16 for the further brake actuator, there being in the extra channel an extra inlet valve 12 (controlled by an electrical signal V6 from controller 7) between brake air supply pipe 8 and pipe 16. An exhaust valve 13 is connected to the outlet of inlet valve 12 and having an exhaust outlet 14 and being controlled by a remote release electrical signal V7 from controller 7; and a link valve 15 is between pipes 10 and 16 which is controlled by an electrical signal V8 from controller 7. FIG. 3 corresponds with FIG. 2 except that there is an additional link valve 17 between pipes 9 and 16 which is controlled by an electrical signal V9 from controller 7.

When all brake actuators have to brake to the same pressure, then any single inlet valve, pair of inlet valves or all three inlet valves can he opened to connect all the brake actuators to the brake air supply pipe 8 depending on the rate of pressure rise required. Likewise, any single exhaust valve, pair of exhaust valves or all three exhaust valves can be opened, connecting all the brake actuators to atmosphere.

Where conditions dictate that the pressure should be different in each brake actuator then all the link valves 11, 15 (and 17 where fitted as in FIG. 3) are closed, breaking the links between the brake actuators.

FIG. 2 has two link valves that ensure all the brake actuators are linked. However FIG. 3 has three valves, this arrangement ensuring the brake actuators can all be directly connected even if one link valve 11, 15 or 17 has failed so that the link between its adjacent brake actuators is broken.

There are occasions where air can become trapped in the brake actuators under fault conditions where power has been lost to the system. In these circumstances, it is desirable to be able to release the trapped air. The remote release arrangement shown in all FIGS., when activated, will cause the exhaust valves 2, 4 (and for each of FIGS. 2 and 3 exhaust valve 13) to open, connecting the brake actuators to atmosphere and ensuring that the link valve 11 in FIG. 1, link valves 11 and 15 in FIG. 2 and link valves 11, 15 and 17 in FIG. 3 is or are opened, connecting the brake actuators together.

Optionally, the remote release function could be implemented with an additional exhaust valve operating in parallel with the exhaust valves 2 and 4 (and 13 on a three axle bogie).

Each link valve (11,15 or 17) can be used to detect and mitigate failure conditions. Any single valve failure in a particular channel in either an open or closed state can be detected and either compensated using the valves from the other channel or isolated to allow the other channel to continue operation.

For example:
- a) With a link valve closed, breaking the air link between the brake actuators, conditions such as an inlet or exhaust valve stuck open or closed can be detected.
- b) With a link valve open, connecting the air link between brake actuators, conditions such as incorrect measurement of brake actuator pressures can be detected.

Certain detected failure modes can be mitigated using a link valve. For example:
- a) If an inlet or exhaust valve sticks closed, then an inlet or exhaust valve in another channel can be used via the link valve in the open condition to change the brake actuator pressure.
- b) If an inlet or exhaust valve sticks open the link valve can be closed to isolate the failed channel and allow the or each channel to continue operation.

What is claimed is:

1. A valve arrangement having first and second brake actuation outputs for first and second brake actuators, for controlling pressure in the first and second brake actuation outputs, comprising: first and second air inlet valves for supplying air to respective ones of the actuation outputs; first and second exhaust valves, each associated with a respective one of the inlet valves; and a line valve between the actuation outputs, the arrangement being such that the pressure in each of the actuation outputs is controllable by control means for controlling the pressure to be either in mode a) jointly, with the link valve enabling air flow between the actuation outputs so that the maximum rate of change of brake actuator pressure is set by controlling operation of the inlet and exhaust valve or in mode b) independently, with the link valve blocking air flow between the actuation outputs so that the rate of change of each brake actuator pressure is set by the condition of its respective inlet and exhaust valves.

2. An arrangement according to claim 1, including control means for selecting whether the pressure in each of the actuation outputs is controlled in mode a) or b).

3. A valve arrangement according to claim 1, wherein the control means can release the pressure in each of the brake actuators.

* * * * *